Patented July 20, 1937

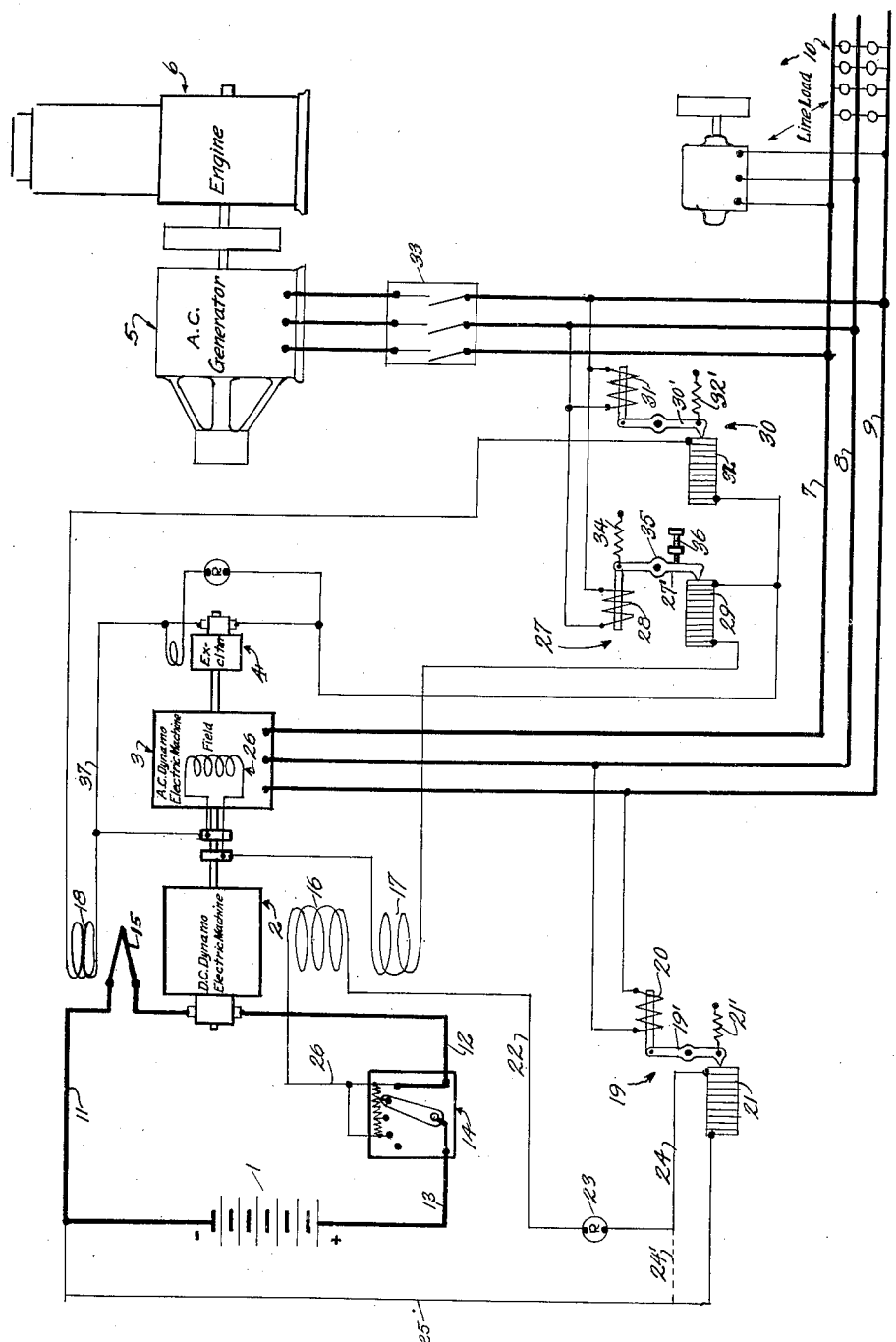

2,087,659

UNITED STATES PATENT OFFICE 2,087,659

ALTERNATING CURRENT-DIRECT CURRENT INTERCHANGING SYSTEM AND CONTROL THEREFOR

Chester F. Strong, New York, N. Y.

Application March 31, 1933, Serial No. 663,796

5 Claims. (Cl. 171—311)

This invention relates to automatic prime mover operated generating equipment and more particularly to an improved alternating current and direct current energy interchange apparatus and control means therefor.

It is one object of my invention to provide an improved automatic prime mover operated alternating current generating system employing internal combustion engines preferably of the Diesel type and to have a highly satisfactory degree of voltage regulation. A further object is to provide an improved energy interchange system and controls whereby a source of auxiliary direct current, such for example as a storage battery, may be effectively employed to insure proper voltage on the A. C. side of the system. Another and more specific object is to provide an improved arrangement of fields on a D. C. dynamo electric machine in combination with a field of an A. C. dynamo electric machine whereby the current for these two sets of fields may be so controlled and coordinated that substantially constant voltage will be maintained on the A. C. system together with battery charging.

Other objects and advantages will be more apparent to those skilled in the art from the following description of the accompanying drawing which is a wiring diagram of my improved system and the controls therefor.

In the accompanying drawing which merely illustrates one specific embodiment the invention might take among other possible forms, there is shown a storage battery 1, a direct current dynamo electric machine 2, a synchronous type alternating current dynamo electric machine 3, and an exciter 4 for machine 3. The rotating members of machines 2, 3, and 4 are either mounted on a common shaft or so connected as to rotate in unison.

A synchronous type A. C. generator 5 is driven by an engine 6 or some other source of power so governed as to maintain an approximately constant speed under varying loads. Wires 7, 8, and 9 represent a three phase alternating current circuit connecting with a variable load 10.

Direct current machine 2 is connected to battery 1 through leads 11, 12, and 13, starting box 14 and series field 15 to battery 1. A major shunt field for machine 2 is generally indicated at 16. A field 18 is wound so as to assist field 16 for excitation purposes while a field 17 is wound so as to oppose field 16. Fields 17 and 18 are preferably of approximately the same ampere turns so that if both fields are simultaneously supplied with the same number of amperes, their opposed polarity will neutralize the effect of each other.

A regulator generally indicated at 19 controls field 16. This regulator comprises a solenoid 20 connected to A. C. lines 8 and 9 while a carbon pile resistance 21 is in series with shunt field 16 as through a wire 22, a hand operated field rheostat 23 and wires 24 and 25 to battery 1, the other side of field 16 being connected to the plus side of the battery as through wires 26, starting box 14 and wire 13.

Field 17 of direct current machine 2 is connected in series with a field excitation coil 26 of alternating current machine 3 and the amount of current flowing through these fields is controlled by a regulator 27 whose solenoid 28 is connected to A. C. lines 8 and 9 of the three phase circuit 7, 8, and 9. The field 26 is shown as of the rotating type connected to fields 17 and wire 37 through slip rings although if desired the field 26 may be stationary and a revolving armature employed. A carbon pile resistance 29 is in series with fields 17 and 26 which are supplied with current by exciter 4. The field 18 of machine 2 is controlled by a regulator 30 whose solenoid 31 is connected across A. C. lines 8 and 9 while a carbon pile 32 of the regulator is in series with field 18. Field 18 receives its supply of current from exciter 4. It will be noted that each of the regulators has a pivoted lever 19', 27', and 30' connected to their respective solenoid cores and adapted to variably press on the carbon piles in accordance with adjustments of springs 21', 34, and 32'.

In operation, if machines 2, 3, and 4 are not operating and machine 5 is also not operating, machines 2, 3, and 4 may be started from the battery by operation of starting box 14. Machine 5 may then be started by current from lines 7, 8, and 9 or by starting engine in accordance with any accepted Diesel practice. A. C. machine 3 may then be synchronized with A. C. machine 5 by adjustment of field rheostat 23 and operation of any usual switching mechanism 33. Rapid changes in load 10 may be of such proportion that generator 5 may be unable to respond to them rapidly enough and also there may be undue voltage variation on lines 7, 8, and 9. Furthermore, the load may, for short periods, go beyond the ability of generator 5 and engine 6 to supply the necessary energy. The purpose of machines 2, 3, and 4 and the control regulators 19, 27, and 30 is to secure the necessary accurate voltage regulation and to interchange energy between A. C. lines 7, 8, and 9 and battery 1 whenever such may be necessary.

If machine 5 is being driven by engine 6 so as to supply current at the desired voltage to lines 7, 8, and 9, then machines 2, 3, and 4 and their regulators 19, 27, and 30 and field rheostat 23 are so set that machine 2 is neither charging battery 1 nor motorizing to cause machine 3 to deliver power to lines 7, 8, and 9. Machine 3 therefore simply operates in synchronism with machine 5 so as to float on the line. Any addition of a heavy load at 10 of sufficient magnitude to cause a fall in voltage across lines 8 and 9 will cause regulator 27 to act on account of its solenoid 28 being opposed by an adjustable spring 34. Hence with a drop in voltage, there is a loss of pull by solenoid 28 thus allowing spring 34 to exert pressure on carbon pile 29 and thereby increase current flowing in fields 17 and 26. Increase of current in coil 26 tends to raise voltage of machine 3 and at the same time field 17 acts differentially against shunt coil 16 to cause a loss of field on machine 2 thereby causing it to motor and draw current from battery 1. Series coil 15 is so proportioned as to oppose coil 16 only to such an extent that under these load conditions the internal resistance drop of battery 1 and armature of machine 2 will be compensated for. Thus the speed of machine 2 and its torque will be maintained to drive machine 3 as a generator.

If the duration of demand for current from machine 3 is short, then upon termination of such demand, regulator 27 returns to its normal setting so that generator 5 again carries all the load. If however the increased demand should continue, then machine 3 must deliver energy to the A. C. line to meet this increased demand, in which case battery 1 will develop a considerable polarization drop of voltage with consequent loss of torque from machine 2 for driving machine 3. Under such conditions regulator 19 is set to act at a very slightly lower voltage than the setting for regulator 27 and regulator 19 causes carbon pile resistance 21 to so act as to increase resistance in circuit of field 16 and thereby cause machine 2 to take more current to compensate for loss of voltage in battery 1 and thus continue to act as a motor for driving machine 3 as a generator.

Under certain circumstances, it is a possibility that by proper design of field 16 the regulator 19 may be omitted and resistance 23 connected to wire 25 as by wire 24', and then any drop in voltage in the battery due to polarization will cause a proper proportionate loss in field 16, thus automatically increasing the motorizing effect to allow for the falling voltage of the battery.

In the event that the voltage on the line 7, 8, and 9 has a tendency to rise above the normal value due to any usual conditions, such as reduced load or otherwise, regulator 19 has its carbon pile fully compressed to restore field 16 to normal strength while resistance of pile 29 is increased due to regulator 27 having its arm 35 brought to rest against a stop 36 thereby reducing or cutting out the differential action of field 17. The increased line voltage also causes solenoid 31 to increase pressure on carbon pile 32 thereby causing energization of field 18 to be increased and accordingly increase the field strength on machine 2 with the result that machine 2 loses its motoring effect and now serves as a generator, the A. C. machine 3 drawing current from the line and inherently serving as a motor under such circumstances to drive machine 2 as a generator thereby to charge the battery.

To those versed in the action of synchronous alternating current generating and motor characteristics, it is evident that machine 3 remains in synchronism with machine 5, the changing of machine 3 from a motor to a generator or vice versa being caused merely by shifting its pole position in relation to the phase of the current on line 7, 8, and 9. This shifting is effected merely by placing a positive or negative torque on D. C. machne 2 as by varying its field strength to make it serve either as a motor or generator.

It is preferable that regulator 27 is adjusted so that for full current flow through its carbon pile, the field excitation of machine 3 is increased only sufficiently for effecting full load output at synchronous speed. Also the tendency of the field for machine 3 is, preferably, to be slightly overexcited, thus tending to cause the machine to act as a synchronous condenser, but it should not be too high so as to disturb line voltage conditions.

From the foregoing disclosure it is seen that I have provided a relatively simple and effective arrangement for insuring proper voltage regulation in an alternating current system together with an ample source of reserve current in a system carrying temporary excessive loads. While I have shown one specific form that the invention might take, it will of course be understood that in various practical embodiments of the invention there may be changes in details and arrangement of parts without departing from the spirit of the invention as set forth in the appended claims.

I claim:

1. An alternating current generating system comprising, in combination, an A. C. dynamo electric machine normally connected to the line load, D. C. and A. C. dynamo electric machines operatively connected to each other, said latter A. C. machine also being connected to the load line, and voltage responsive means for controlling the field strength of each of said operatively connected machines independently of line current.

2. A generating system comprising, in combination, an A. C. dynamo electric machine adapted to normally supply line load, another A. C. dynamo electric machine connected to the line and having a suitable field, a D. C. dynamo electric machine operatively connected to said latter A. C. machine, opposed fields for said D. C. machine, and means for controlling all of said fields automatically in accordance with variations in line voltage thereby to maintain substantially constant line voltage independently of line current.

3. A generating system comprising, in combination, an A. C. dynamo electric machine adapted to supply line load, another A. C. dynamo electric machine connected to the line, a D. C. dynamo electric machine for driving said latter A. C. machine and having a shunt field and two fields of opposed polarity, and means for variably adjusting said latter fields automatically in accordance with variations in line voltage above or below normal thereby to variably control said A. C. machine that is connected to the D. C. machine and thus control the line voltage to maintain it substantially constant.

4. A generating system comprising, in combination, a prime mover operated A. C. dynamo electric machine adapted normally to supply line load, a D. C.-A. C. dynamo electric machine unit with the A. C. machine thereof connected to the line, fields for each of the machines of said unit, and means for variably controlling each of said fields thereby to cause the A. C. machine of said unit to either lead or lag automatically in accordance with variations in line voltage above or below normal thus to maintain substantially constant line voltage independently of line current.

5. A generating system comprising, in combination, a prime mover operated A. C. dynamo electric machine adapted normally to supply line load, a D. C.-A. C. dynamo electric machine unit with the A. C. machine thereof connected to the line, fields for each of the machines of said unit, means for variably controlling each of said fields thereby to cause the A. C. machine of said unit to either lead or lag automatically in accordance with variations in line voltage above or below normal thus to maintain substantially constant line voltage independently of line current, and a storage battery for supplying current to the D. C. machine of said unit whereby in line voltages above normal the A. C. machine of said unit will tend to drive the D. C. machine thereof thereby to charge said battery.

CHESTER F. STRONG.